Figure 6:
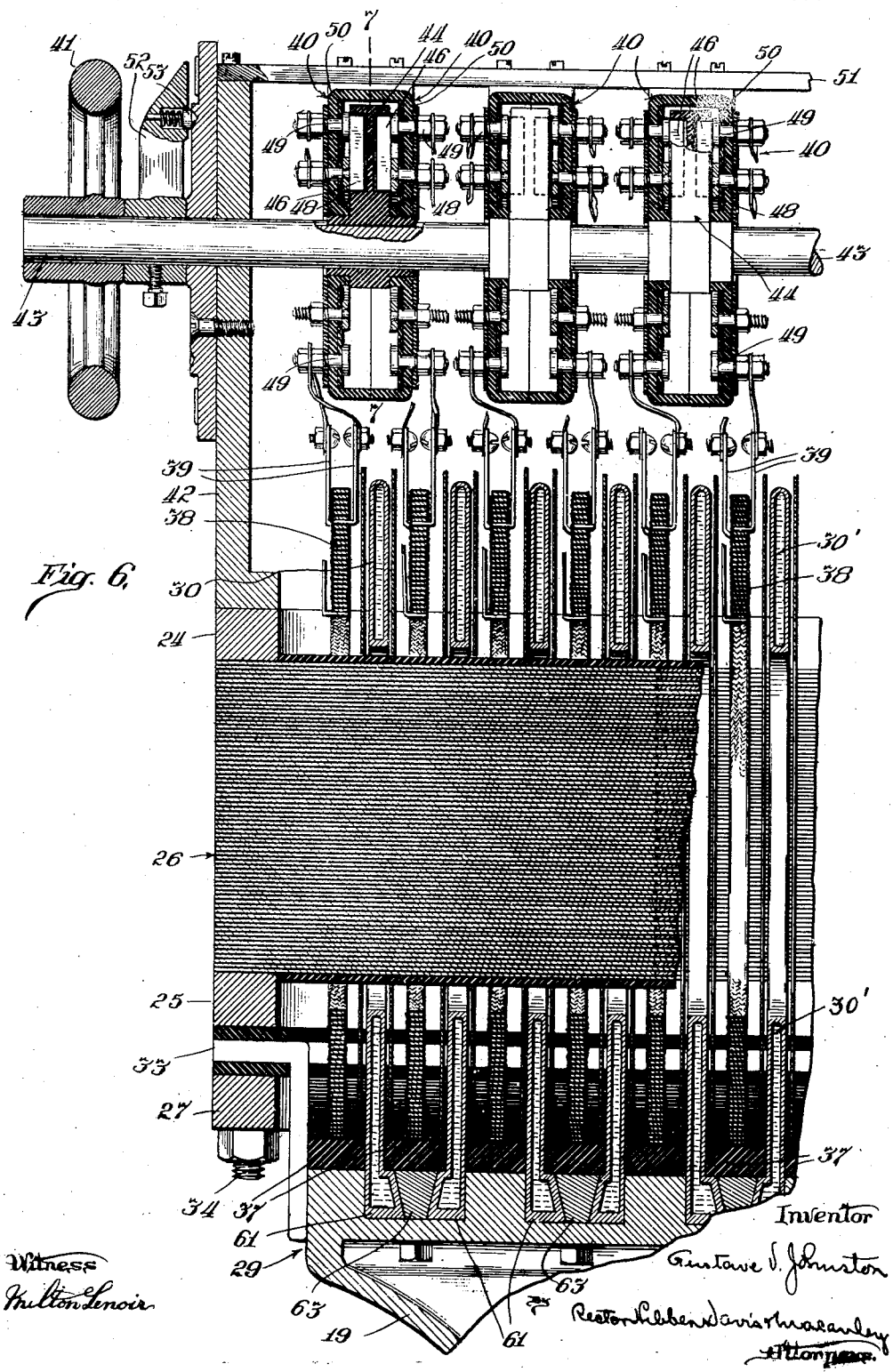

July 15, 1924. 1,501,782
G. V. JOHNSTON
APPARATUS FOR ELECTRICALLY BUTT WELDING TUBING
Filed Oct. 4, 1920 8 Sheets-Sheet 1
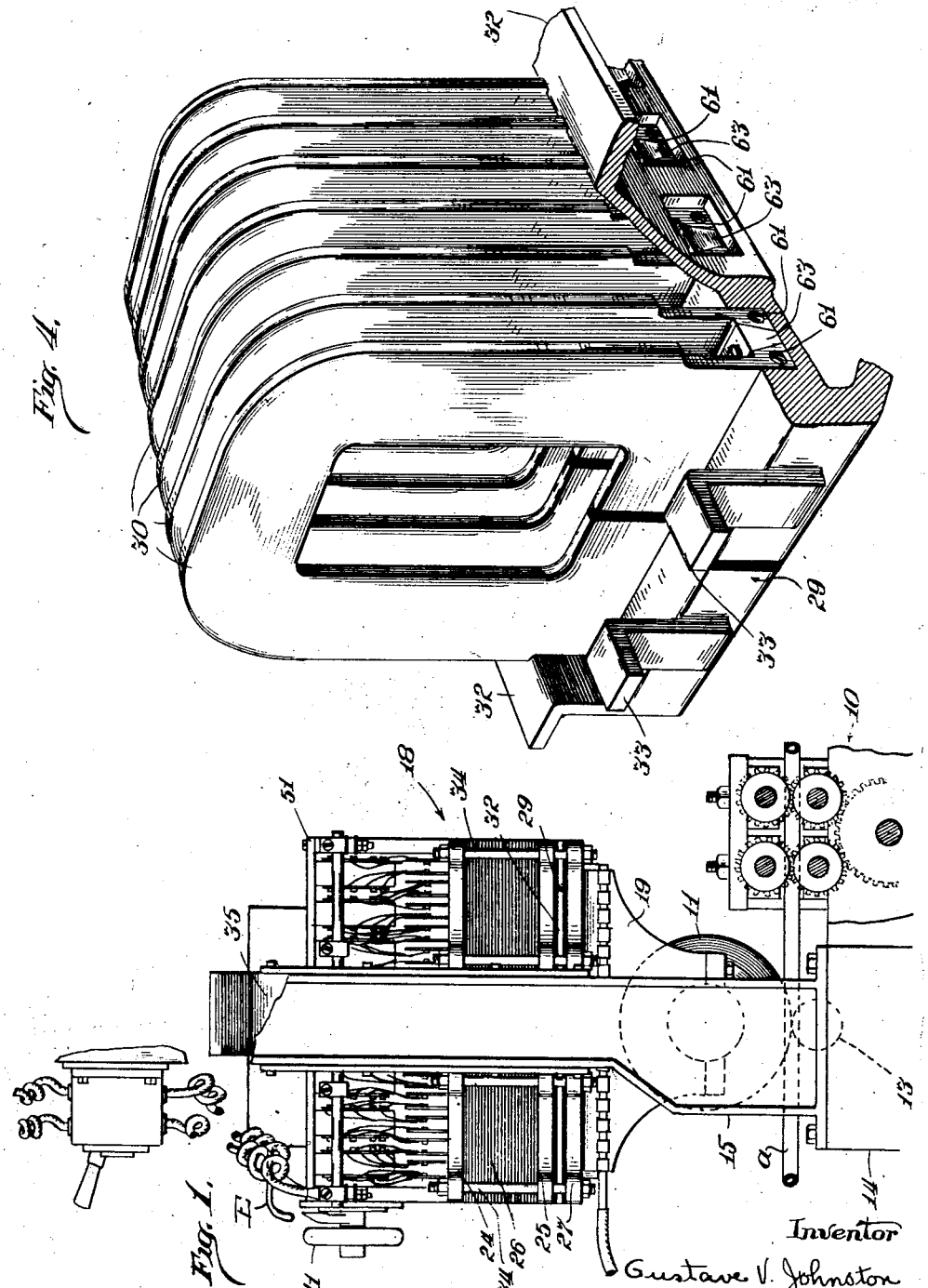

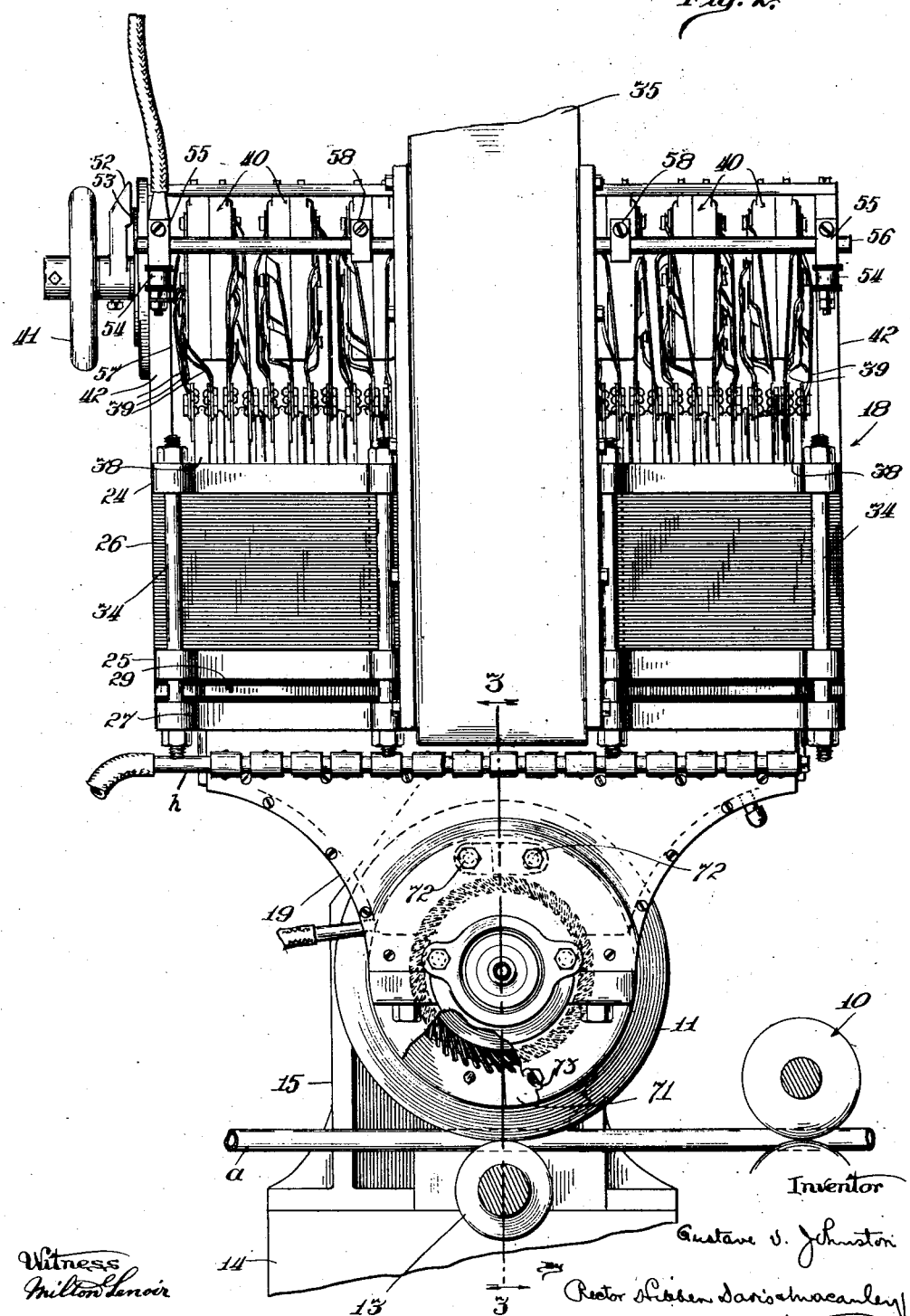

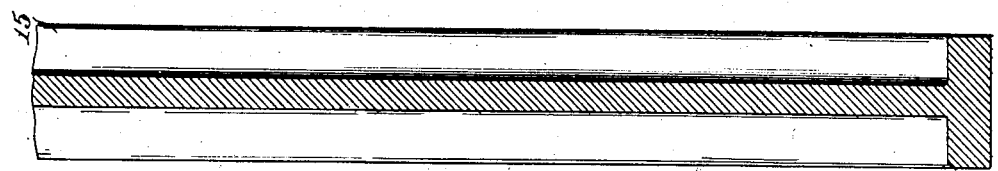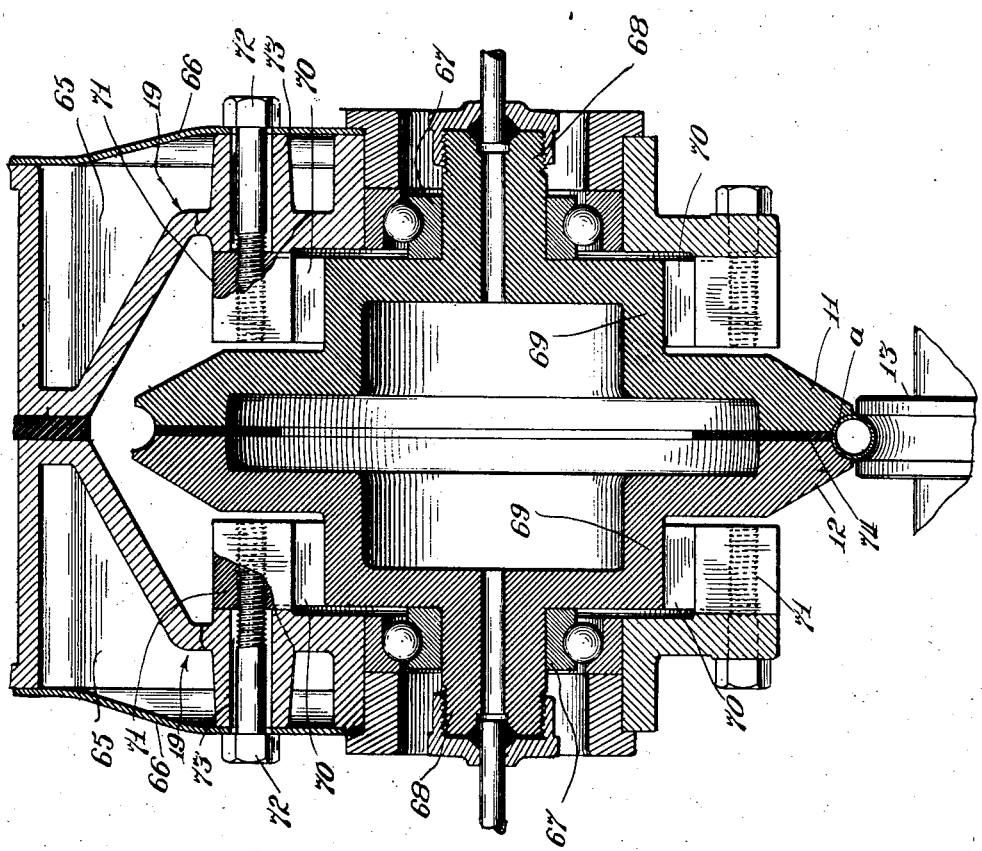

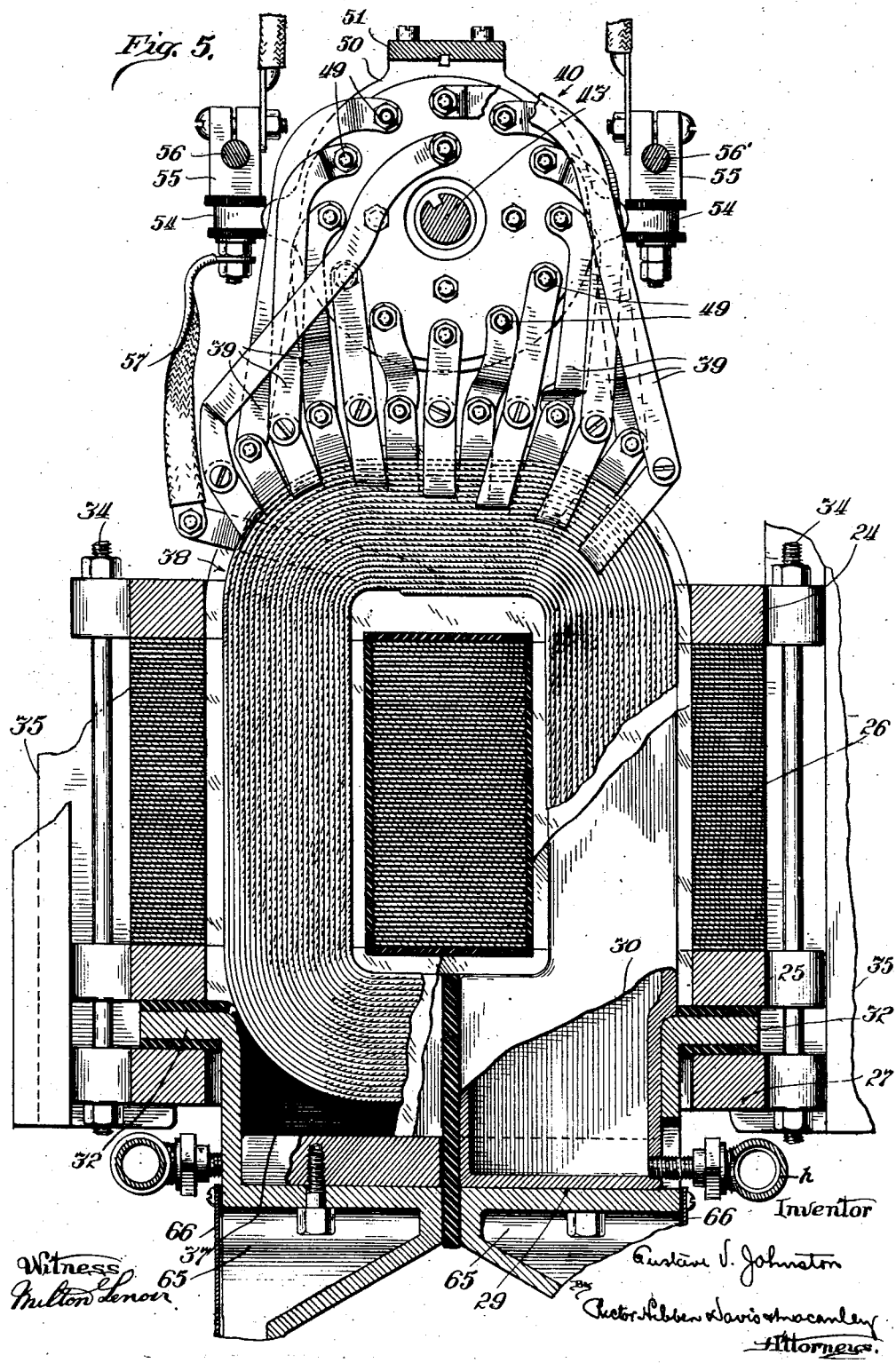

July 15, 1924. 1,501,782

G. V. JOHNSTON

APPARATUS FOR ELECTRICALLY BUTT WELDING TUBING

Filed Oct. 4, 1920 8 Sheets-Sheet 5

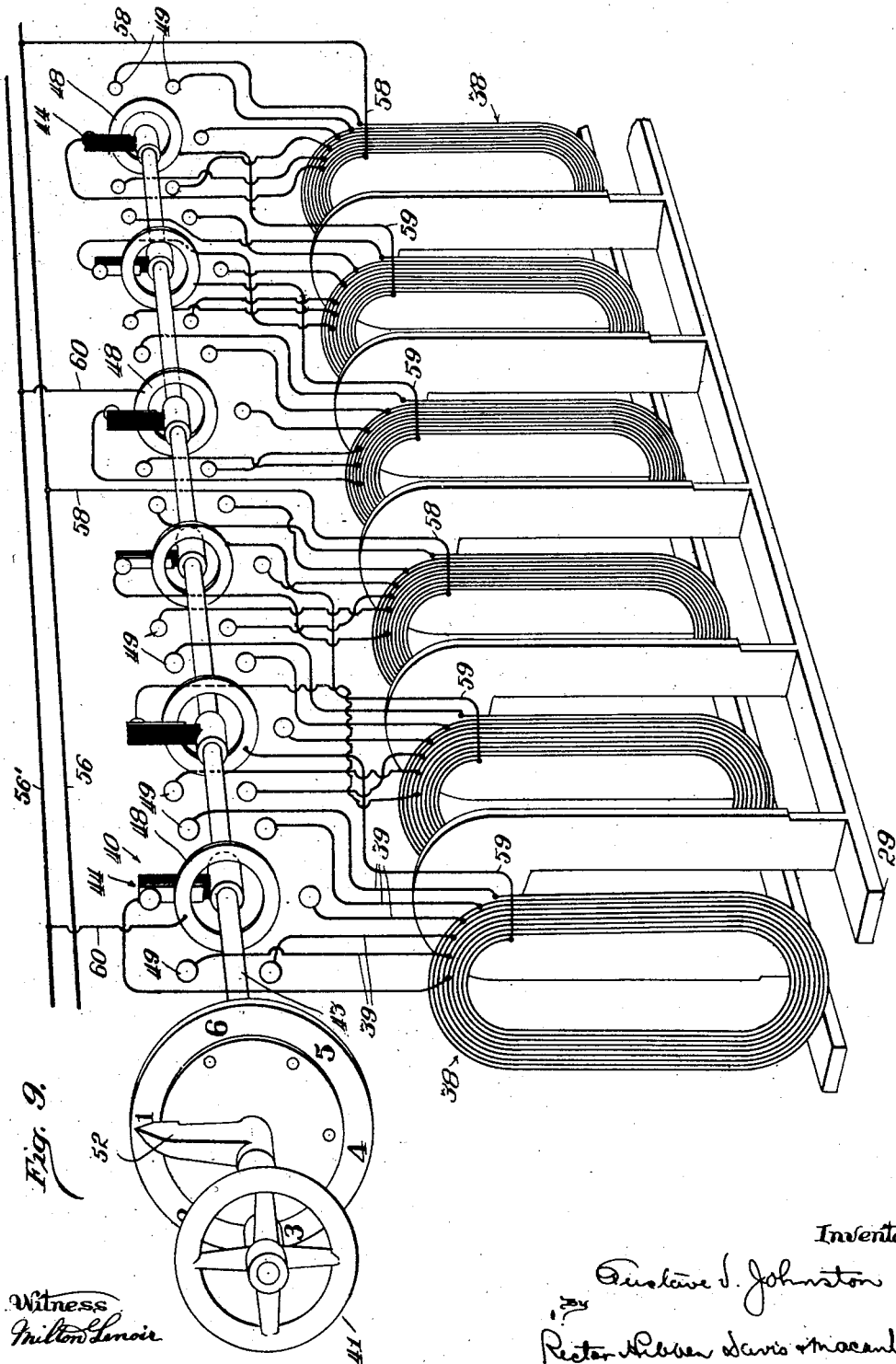

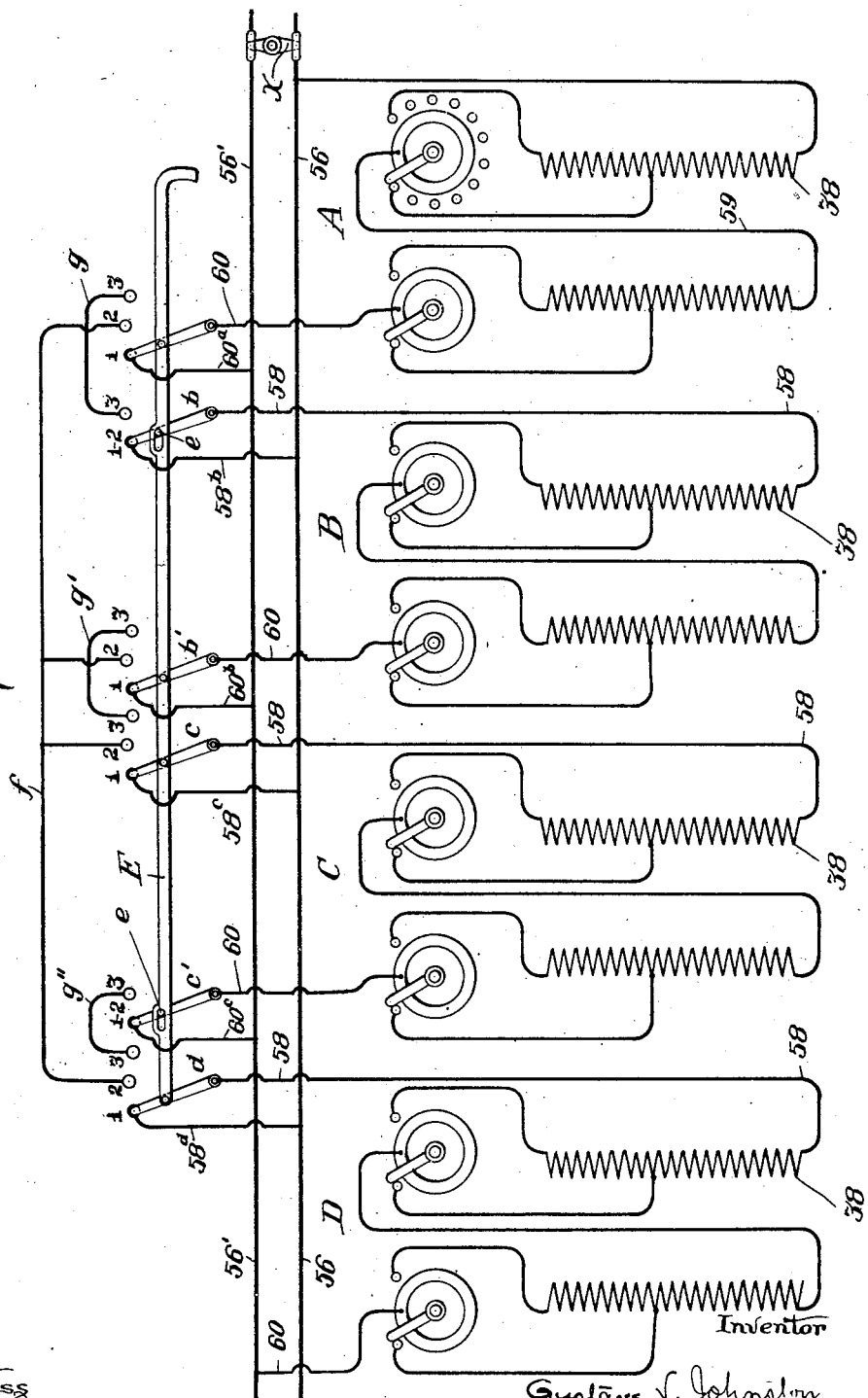

Patented July 15, 1924.

1,501,782

UNITED STATES PATENT OFFICE.

GUSTAVE V. JOHNSTON, OF CHICAGO, ILLINOIS, ASSIGNOR, BY MESNE ASSIGNMENTS, TO THE ELYRIA IRON AND STEEL COMPANY, A CORPORATION OF OHIO.

APPARATUS FOR ELECTRICALLY BUTT-WELDING TUBING.

Application filed October 4, 1920. Serial No. 414,408.

*To all whom it may concern:*

Be it known that I, GUSTAVE V. JOHNSTON, a citizen of the United States, residing at Chicago, in the county of Cook and State of Illinois, have invented certain new and useful Improvements in Apparatus for Electrically Butt-Welding Tubing, of which the following is a specification.

My invention relates to apparatus for electrically butt-welding tubing, and in some of its aspects constitutes an improvement upon the apparatus set forth and claimed in my co-pending application Serial No. 302,392 filed June 29, 1919.

In the butt-welding of tubing by electricity, and more especially so in effecting the weld on tubing that is moving at a relatively high rate of speed (as was first made possible, I believe, by the practice of the method or use of the apparatus set forth in my aforesaid application) proper control of the amount of, and the manner of application of, the current are matters of prime importance in the maintenance of the welding condition. In commercial practice it is not only important that control of the current shall be exercised by the operator, but it is very desirable that such control shall be promptly applicable, shall be of a character to give both wide variation and very close regulation, and shall not require the stopping of the operation of the machine. Of course where the same machine is intended for use in welding tubing of different gauges or thicknesses, with accordant changes in current-demand, wide variation in current supply is a necessity and further, many conditions are encountered in practice,—such, among others, as changes in the predetermined speed of tube-travel, variation in condition or composition of the tube stock, and perhaps other factors of more obscure nature,—that call for compensatory variation of the current condition (sometimes in the midst of an operating run) to maintain a desired adequacy of the weld and the avoidance of stock-burning and in these regards the regulation must be very close for satisfactory results.

My present invention has for one of its objects to provide a simple, efficient and desirable apparatus for securing and maintaining, subject to variation at will and for very close regulation, the proper current supply to the welding electrodes in a machine of the character described. Another object of my invention is to provide an improved transformer suitable for the work described and kindred purposes. Other and further objects will become apparent to those skilled in the art from the following description taken in conjunction with the accompanying drawings wherein I have shown a single embodiment of my invention which I have found to be commercially practical and desirable.

Figure 7:
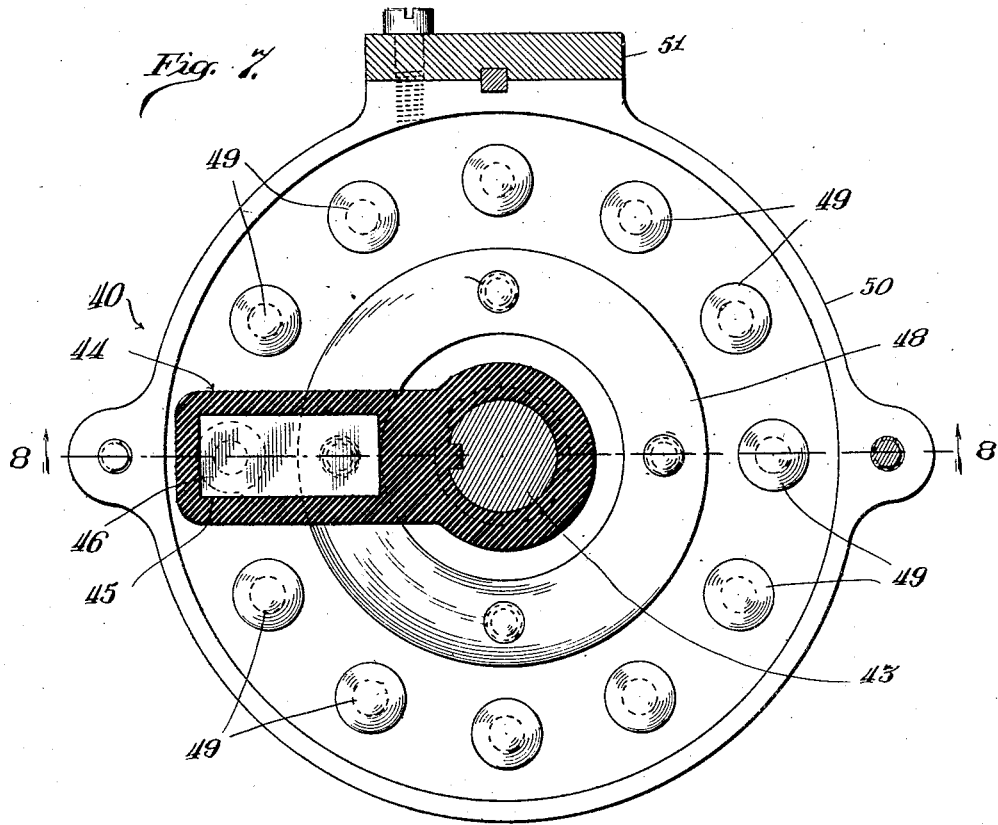
Figure 8:
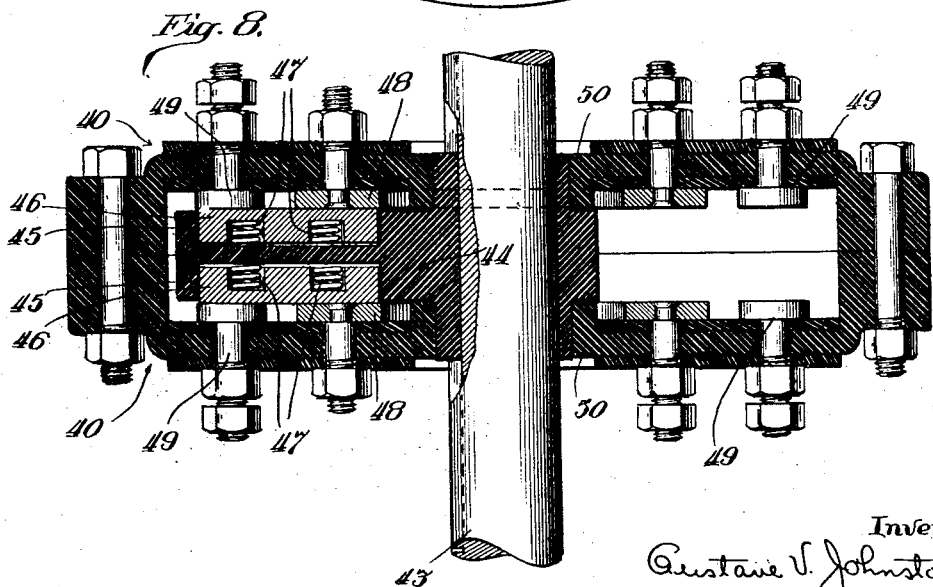

In the drawings, Fig. 1 is an illustration of diagrammatic character showing portions of a completed tube-forming and welding apparatus; Fig. 2 is a side elevation with parts broken away on a larger scale; Fig. 3 is a tranverse section on line 3—3 of Fig. 2; Fig. 4 is a fragmentary detail of a transformer secondary; Fig. 5 is a tranverse section through the transformer and regulator; Fig. 6 is a longitudinal section through a fragment thereof; Fig. 7 is a section on line 7—7 of Fig. 6; Fig. 8 is a section on line 8—8 of Fig. 7; Fig. 9 is a wiring diagram; and Fig. 10 is a modified wiring diagram.

10 indicates, diagrammatically, a mechanism for presenting a steel tube, having an open butt seam, to the welding throat that is formed by roller electrodes 11 and 12 and tube-supporting means, as roller 13; these throat elements being in non-contacting relation electrically, but mechanically forming an almost complete circular compression-pass through which the tube is fed with the electrodes straddling the seam cleft, and frictionally rotating the electrodes in its passage. The tubing *a* may be either pushed or pulled through the throat, and may either be pre-formed in lengths or formed in continuous fashion from flat stock as it approaches the welding throat. The supporting roller 13 may be positively driven or frictionally turned by the tubing, variations in these and other particulars being dictated by circumstances that do not concern the embodiment of the present invention.

For illustrative simplification of a single construction, the fragmentary mechanism 10 may be regarded as typifying a power driven apparatus for forming a tube and feeding the tube-formed stock through the welding throat (in which case the roller 13 need have no power-shaft connection) and the feeding mechanism should be geared to impart a relatively high speed to the work.

While the speed of tube-propulsion may be and, in my experience, should be, varied in accordance with the thickness and composition of the tube-stock (although maintained substantially constant for any given character of stock) this factor of speed of progress of the tubing is not unimportant and has material bearing on my present invention in some of its aspects. I have found in practice that mild steel tubing, of, say, an inch diameter and .035" thickness may effectively be welded at a rate of 80 feet per minute and upwards, and that high-carbon steel tubing, hot rolled from old rail stock and of a thickness averaging about .110", may be welded at the high rate of 20 feet or more per minute. It will be realized that where alternating current is used (as I have used it) of the usual 60-cycle frequency, say, very appreciable tube-progress takes place during the intervals between attainment of maximum heating effect due to successive current alternations, and therefore it is of great moment, on the one hand, so to regulate the current that the temperature of the metal at the seam-cleft is raised very rapidly, to assure the attainment of welding heat and completion of the weld, and yet, on the other hand, so to control the current as to minimize lateral spreading of the high temperature zone in the stock and prevent burning thereof at or near the seam-cleft. I have found that I am able to produce excellent results in the matter of current regulation and consequent temperature control, in a machine of the character described, as well as to better the performance of the transformer itself by the employment of devices combined as hereinafter described.

The transformer shown has a plurality of primary coils associated with a single-turn, multiple-section secondary, with the primary coils suitably connected and controlled by multiple point switches capable of cutting into or out of service numerous coil-turns but at a small number per switch-step. For the desired regulation these switches are connected together for coincident operation to cut in or cut out corresponding turns of their respective coils in unison and I prefer that there be a switch for every coil. These primary coils are preferably arranged for ready connection in different relations—in series, or multiple-series or series-multiple, to accord with the voltage supplied to the primary coils from the power circuit. This may be done in the initial setting up of the transformer, as a matter of permanent wiring, or as hereafter described control switches may be provided for changing the character of the coil connected readily. Furthermore, I preferably construct the transformer in a manner suitable to minimize voltage drop or losses in the secondary and its connected parts and to afford a desirable cooling of the secondary; and also I preferably construct for efficient and desirable electrical and mechanical connection between the roller electrodes and the transformer secondary.

In the specific construction shown a single tube-supporting steel roller 13, preferably non-magnetic, as of manganese-steel, is mounted to rotate on a fixed horizontal axis in the base frame 14, and has formed therein a nearly semi-circular groove that is struck on a radius slightly less than the radius of the formed but unwelded tube. The transformer secondary carries the brackets 19 in which the roller electrodes 11 and 12 are rotatably mounted. These electrodes, I prefer, are quite large, are rigidly connected for synchronous rotation on a horizontal axis, and are jointly grooved supplementally to the grooving of roller 13.

The curvatures of the grooves in the electrode-couple and roller should be made to accord with a tube-perimeter somewhat smaller than that which the tube-stock presents when its confronting seam-edges are merely pressed together, but, since it is desirable to minimize the burr formed in welding the edges, this undersizing of the tube-pass or throat should be rather slight. The softening of the metal at the seam-cleft by the heat developed by the passage of the current therethrough permits the applied pressure to reduce slightly the diameter of the tube as it is being welded in its passage through the throat.

The transformer frame, in the construction shown, has frame plates 24 and 25 between which the laminæ of the core 26 are clamped, the core being herein shown as of the ordinary figure 8 shape. A bottom plate 27 is provided between which and the plate 25 the single-turn secondary 29 is insulatedly secured. The spaced sections, 30 of the secondary, split and insulate at their bottoms, are connected at their lower ends with the two electrode-carrying bases or brackets 19 that have projecting flanges and ears 32 and 33 which are suitably insulated and clamped between the plates 25 and 27, the transformer frame structure being held together by vertical bolts 34, and secured in a yoke 35 suitably positioned in the machine frame.

Fibre saddles 37 (Fig. 5) spanning between the brackets 19, support the primary coils 38 that are adequately spaced with respect to, and insulated from, the secondary sections and the core, for ventilation, each of these primary coils being preferably made of a single ribbon or flat wire, and each coil having a large number of taps 39 to its superposed turns, preferably a tap to each turn for approximately the outer half of the total. Illustratively, if thirty-five turns be used there may be, say, seventeen taps. Each tap 39 runs to a different contact point of a switch 40, there being a switch for each coil although, as shown in Fig. 8, these switches are preferably arranged in pairs for mechanical simplification. Each switch is arranged to control the service connections of its appropriate coil, that is to say, to vary the number of turns of said primary coil included in the service circuit, and these several switches are arranged for operation in common (and in the preferred form shown in unison) by a regulator-handle, so as simultaneously (and also equally, in the preferred form shown) to vary the number of turns in service in the affected coils. The movable switch elements, as shown, are controlled from a common handle or wheel 41 disposed in position to be easily accessible to the operator. With such arrangement, permitting the uniform variation for all primary coils of the number of turns in service, it will be seen that local action is minimized and the distribution of effect of the primary current is always uniform.

Specifically, the transformer frame carries brackets 42 for the regulator shaft 43 on which the movable switch elements 44 are fastened, each of these movable elements being double faced to serve the two opposing switches. Thus, each movable switch arm 44 is oppositely socketed as at 45 for a pair of contact shoes 46 for two switches, each pressed outwardly by springs 47 for constant engagement with a ring-contact 48, and selective connection with the spaced tap-terminal contacts 49. These fixed contacts are carried by insulating cups or shell-sections 50 bolted together in pairs and all secured to a top bar 51 fastened to the brackets 42. An index finger 52 near the hand wheel indicates the number of coils cut into or out of service, and a snap-over friction-latch 53, carried by this finger, tends to hold the switch element always in a contacting position with respect to some tap terminal. Preferably the contact shoe slips from point to point without losing contact with one until after it has engaged the next, so that the primary circuit is not broken. The frame-brackets have bosses 54 to carry the clamps 55 for bus rods, 56, 56', to which the power wires are connected, and the coils may be connected with these bus-bars, in initially connecting up the transformer, by clamp-terminals 57. Of course, the number of primary coils and turns thereon may be varied, but to facilitate utilization of the transformer in connection with different commercial voltages I preferably make the number of primary coils a multiple of four. Sixteen is a desirable number, where connection with power circuits of from 110 V. to 440 V. is contemplated, but for diagrammatic purposes I have not illustrated so many. According to the voltage of the power circuit the primary coils are preferably connected in smaller or larger groups in series, and these groups may be connected in multiple or series, or series-multiple in the circuit. Thus, diagrammatically, in Fig. 9, the coil groups are in parallel; the innermost turn of the right-hand coil being connected at 58 to the bus-bar 56 while the switch-ring 48 is connected at 59 to the innermost turn of the next coil, and so on throughout the series group shown as 3 coils, the last switch of the group having its contact-ring 48 wired as at 60 to the bus-bar 56'. The bus-bars are served from a line through main switch 4, Fig. 1, conveniently accessible to the operator. In practice I have satisfactorily connected up the transformer to give between four and five volts (measured across the secondary bases) with all coils in service and have employed a regulation giving between two and three volts as a minimum when all tapped turns are out of circuit. These suggestions of desirable figures are illustrative only.

Where variability of connection of the transformer-coil-groups is desired, enabling them to be connected at will in series or series-multiple, as well as in the multiple relation heretofore described, I meet this desideratum by the provision of switches additional to the rotary regulator-switches 40, thereby furthering the capability of the machine to meet widely varying conditions such as stock changes ranging from very thin to very thick stock. In Fig. 10 I diagram a construction for taking care of four groups (A, B, C and D) of coils, although of course more or less groups may be provided for, and more coils than the two may be used in each (or any) group. The variable connections are controlled by four switch-groups, $a'$, $b$, $b'$; $c$, $c'$; and $d$; the six switch blades being shown as mechanically connected by a connector-link E that may move blades $a'$, $b'$, $c$ and $d$ across respective groups of three contacts. This link may have lost-motion pin-and-slot engagements $e$ with blades $b$ and $c'$ to lose one step of rightward movement, blades $b$ and $c'$ having only two contacts (leftward and center). Wire 58 (as in Fig. 9) connects the right coil of group A with bus-bar 56 and wire 59 connects ring 40 to the innermost turn of the next coil 38, but the connection from the ring of the leftward regulator section of group A to the bus-bar 56' is made through wire 60, blade $a'$, left contact therefor and wire $60^a$. Coil group B has its wires 58 and 60 respectively connected to blades $b$, $b'$, the leftward contacts of which respectively are connected with bus-bars 56 and 56' by wires $58^b$ and $60^b$. Coil group C has connections in the same arrangement as group B, (the connection shown being via 58, c, 58ᶜ and 60, c', 60ᶜ) while group D has wire 60 connected direct with bar 56' and wire 58 connected with switch d, left contact therefor and wire 58ᵈ to bus-bar 56'. Thus in the relation indicated in Fig. 10 the coil groups are in multiple, as in Fig. 9. If, however, link E be thrown over one step, the coil groups are brought into series-multiple with groups A, B in one parallel; groups C, D in another and these two parallels in series; and when the link is moved a second step all coils are thrown into series. The first step of link-movement displaces only four switches a', b', c and d to meet their middle contacts, switches b and c' remaining in connection with their leftward contacts by virtue of the lost-motion joints e. The four middle contacts referred to are connected by wire f, so that from bus-bar 56 current flows through the two coil groups A and B in parallel to wire 56 and thence through the two groups C and D in parallel to bus-bar 56'. The second step brings all blades to their rightward contacts, and through respective connections g, g' and g'' between right contacts of switches a', b; b', c; and c', d, all coils are series connected between bus-bars 56 and 56'. This supplementary switch arrangement may be disposed in a housing h mounted on frame piece 51 of the transformer, as shown in Fig. 1, with the handle of switch link E conveniently accessible.

The special construction and facility of arrangement as above described is advantageous in these particulars, among others: The division of the primary windings into a rather large number of rather narrow coils properly spaced, makes for rapid and satisfactory heat dissipation and permits the use of small control-units or switches, while the use of flat or ribbon like wire in single strand "pan-cake" winding facilitates the connection and compact placement of the many tap-offs from the different turns and so accommodates the wiring to the best requirements of the compact, rather small switches that I provide. Further, and more importantly perhaps, the subdivision of the primary-current conductor into the small coils and the provision of the like number of regulator switches (especially with the latter connected in multiple-series as shown in Fig. 9) so reduces the current handled by each switch-blade that the short-circuited current, which is induced when a switch-blade passes from one fixed contact to the next, is so small as to cause no trouble. And additionally, the variability of the connection increases the range of effective regulation.

Of course, in the operation of the apparatus losses occur in the secondary and, by reason of its connection to the electrodes, it is manifestly desirable both to minimize these losses and to provide means to dissipate the heat engendered in the secondary and its connections and indirectly to cool the primary coils. To these ends I prefer to construct the secondary and to connect the electrodes therewith as follows:

The secondary sections shown are water-cooled and are disposed in the closest connection, but detachable relation, to the base or bracket members. These brackets, too, are water-cooled; are equipped with adequate ball-bearings for supporting the electrodes; and are most intimately connected for conductivity with the roller electrodes, the latter being, (as in my previous machine) also water-cooled. Thus, each secondary section has a hollow center 30' with provisions for connecting the bottoms of its legs respectively to water supply and eduction headers h, these sections having transverse feet 61 at the bottom thereof, each forming a right-angle at the heel and an acute angle at the toe, so that pairs of said sections, stood in transverse channels of the bases or brackets 19 may be jointly secured in place and in most intimate pressure contact with the bases by dove-tail blocks 63 screwed to the bases (see Fig. 6). Each bracket 19 has below its solid top a water circulation space 65 overlain by a detachable cover plate 66, and these spaces are connected with the water-flow headers. Each such bracket carries near its outer side a ball bearing 67 to receive the hub 68 of the corresponding electrode 11 or 12, each electrode having a boss 69, and on these bosses there bear a very large number of tangentially-disposed contact brushes 70 that are fixedly secured in ring sectors or arcs 71 bolted as at 72 to the bracket structure. I prefer that the ring-clamping bolts 72 shall work in slightly diagonal convergent slots 73 in the brackets so that as the brushes wear their sectors may be adjusted a little closer together and the brushes turned down, if need be.

As in my prior machine, the pair of electrodes, bolted together, and suitably insulated from each other at 74, provide an interior water space for suitable connection with the headers. With the low voltages used, water-filling of the electrode space seems to have no appreciable short-circuiting effect.

While I have herein described in some detail a single embodiment of my invention which I believe to be specifically advantageous and desirable some of the refinements of which I may claim for their specific advantage, it will be understood by those skilled in the art that many changes may be made in the precise embodiment of my invention without departure from the spirit thereof and within the scope of the appended claims.

I claim:

1. In a tube welding machine, the combination of means, including seam-straddling electrodes and opposed tube support, forming a welding throat, an alternating-current transformer having its secondary connected with the electrodes and having a plurality of primary coils in a circuit excluding said secondary, a plurality of switches respectively controlling the number of service-turns of different primary coils, and means for operating said switches.

2. In a tube welding machine, the combination of means, including seam-straddling electrodes and opposing tube support, forming a welding throat, an alternating-current transformer having its secondary terminals electrically connected with the electrodes and having a plurality of primary coils grouped in multiple series in a circuit excluding said secondary, a plurality of switches controlling the service-turns of primary coils respectively in the several groups, and means for operating said switches in common.

3. In a tube welding machine, the combination of means, including seam-straddling electrodes and opposing tube support, forming a welding throat, an alternating current transformer having a single-turn secondary with its terminals electrically connected with the electrodes and having a plurality of primary coils grouped in multiple series in a circuit excluding said secondary, a plurality of switches connected with, and controlling the service-turns of, a like plurality of primary coils in one series-group, and means common to said switches for operating them.

4. In a tube welding machine, the combination of means, including a tube support and seam-straddling electrodes, for rapidly passing, exerting pressure upon, and supplying current to, butt-seamed tube stock, a transformer having its secondary connected to the electrodes and having a plurality of primary coils in a circuit excluding said secondary and each having a plurality of turns that are tapped, and a regulator comprising a plurality of multiple-point switches, with the points of each switch connected with the taps of a respectively corresponding coil to cut in or cut out coil-turns, and means for operating said switches in common.

5. In a tube welding machine, the combination with means, including tube supporting and feeding means and seam-straddling electrodes, for rapidly passing, exerting pressure upon, and applying current to, butt-seamed tube stock; means for supplying closely-regulated current of low voltage and high amperage to said electrodes, comprising an alternating current transformer having a single-turn secondary connected to the electrodes and including a number of parallel spaced sections, a plurality of primary coils in a circuit excluding said secondary and respectively located in the interspaces between said secondary sections, and regulating means for cutting in and out turns of a plurality of said primary coils in unison.

6. In a tube welding machine, the combination with means, including tube supporting and feeding means and seam-straddling electrodes, for rapidly passing, exerting pressure upon, and applying current to, butt-seamed tube stock; means for supplying closely-regulated current of low voltage and high amperage to said electrodes, comprising an alternating current transformer having a secondary connected in circuit with the electrodes and including a number of parallel spaced sections, a plurality of primary coils respectively located in the interspaces between said secondary sections and connected in a circuit excluding said secondary, and regulating means for cutting in and out sequentially a plurality of turns of all of said respective primary coils in unison.

7. In a tube welding machine, the combination with means, including seam-straddling electrodes and opposed tube support, forming a welding throat; a transformer having its secondary connected with the electrodes and formed in a plurality of spaced parallel sections, and having a plurality of primary coils arranged in the interspaces between said sections; of a regulator comprising a shaft extending in proximity to all the primary coils, switch blades on said shaft, one for each coil, switch contacts for said respective blades, completing a switch for each coil, said respective switch contacts connected with a plurality of turns of the appropriate coil, and means for turning said shaft whereby to operate the switches in unison equally to affect all of the primary coils.

8. In a machine of the character described, the combination of electrodes; a transformer, having its secondary terminals connected with said electrodes and formed in a plurality of spaced sections, and having a plurality of primary coils each arranged in an interspace between secondary sections, and having a frame; a shaft rotatably mounted on said transformer frame; a plurality of switches through which said shaft passes, each having a series of fixed contacts and a movable contact that is secured to the shaft, said fixed contacts being suitably connected to spaced-apart points of a corresponding primary coil, whereby each switch governs the number of windings in service of a respective primary coil; and means for rotating said shaft.

9. In a machine of the character described, the combination with the electrodes, and a transformer having its electrode-carrying secondary divided into spaced sections and its plural primary coils arranged in the spaces between the secondary sections, of a regulator comprising a plurality of switches, each for a primary coil, said switches being arranged in pairs and having movable contact-carrying arms, each common to a pair of switches, and having respective fixed contacts that are connected to spaced-apart points of the appropriate primary coils, and an operating shaft carrying said movable contact arms for operating all of the switches in unison.

10. In a machine of the character described the combination with tube-supporting means and seam-straddling electrodes forming a welding throat, of an alternating current transformer having a secondary connected with the electrodes and having a plurality of primary coils each formed in a "pancake" winding of flat wire, and having taps from numerous of its turns; and a regulator comprising a plurality of switches, each for a primary winding and each having fixed contacts connected with taps of the appropriate primary winding and each having a movable blade arranged to retain connection with one fixed contact until after it has made connection with the next, and means for operating said switches.

11. In a machine of the character described, the combination of welding electrodes, an alternating current transformer having a single-turn secondary connected with said electrodes and having a primary winding consisting of a plurality of coils, and switch means to connect said coils in different electrical relations at will.

12. In a machine of the character described, the combination of welding electrodes, an alternating current transformer having a single-turn secondary connected with said electrodes and having a primary winding consisting of a plurality of coils, and switch means to vary at will the number of service-turns of certain of said coils.

13. In a machine of the character described, the combination of welding electrodes, an alternating current transformer connected therewith having a primary winding comprising a plurality of groups of coils, the coils of each group being in series, and switch means for connecting said groups at will in multiple or series-multiple.

14. In a machine of the character described, the combination of welding electrodes, an alternating current transformer connected therewith having a primary winding comprising a plurality of groups of coils, the coils of each group being in series, and switch means for connecting said groups at will in multiple or series.

15. In a machine of the character described, the combination of welding electrodes, an alternating current transformer connected therewith having a primary winding comprising a plurality of groups of coils, the coils of each group being in series, and switch means for connecting said groups at will in series or series-multiple.

16. In a machine of the character described, the combination of welding electrodes, an alternating current transformer connected therewith having a primary winding comprising a plurality of groups of coils, the coils of each group being in series, and switch means for connecting said groups at will, in multiple, series, or series-multiple.

17. In a machine of the character described the combination of welding electrodes, an alternating current transformer therefor having a primary winding comprising a plurality of coils, switch means to connect said coils in different group relations and other switch means operable to vary the number of service-turns of coils in each group in common.

18. In a machine of the character described in combination of welding electrodes, an alternating current transformer thereof having a primary winding comprising a plurality of coils, switch means to connect said coils in different groups relations and other switch means operable to vary the number of service-turns of all coils in unison.

19. In a machine of the character described, the combination of the frame, tube supporting means therein, electrodes separated from, but cooperating with said tube-supporting means to form a welding throat, an alternating current transformer having hollow secondary-terminals or brackets in which said electrodes are mounted for rotation and with which said electrodes make electrical connection, and means for circulating a cooling medium through and in direct contact with the metal of said hollow terminals.

20. In a machine of the character described, the combination of a frame, tube supporting means therein, electrodes separated from but cooperating with said tube supporting means to form a welding throat, an alternating current transformer having a plurality of secondary sections each of single open-loop form of hollow construction, terminal brackets upon which said secondary sections are set, said brackets affording bearing for and having provision for electrical connection with said electrodes, each said bracket comprising a hollow casting open at its face and a base plate detachably secured thereto for covering the opening, means for securing the secondary sections upon said brackets, said means extending into and accessible from the interior of said brackets, means for supplying cooling fluid to the interiors of the brackets and the secondary sections, and primary coils interposed between the secondary section.

21. In a machine of the character described, the combination of means forming a tube-pass and comprising tube supporting means and cooperating roller electrodes, an alternating current transformer comprising brackets affording bearing for said electrodes and having means for electrical connection with the later, secondary sections having their bases detachably mounted in said brackets and arranged in parallel, spaced relation, and primary coils arranged in the interspaces between the secondary sections.

22. In a machine of the character described, the combination of electrodes, a transformer having secondary sections each of single open-loop form, terminal brackets wherein said sections are seated in spaced relation, said brackets affording bearing for and having provision for electrical connection with said electrodes, and means for detachably clamping the section-bases in the brackets.

23. In a machine of the character described, the combination of electrodes, a transformer having separate yoke-shaped secondary sections each having foot-enlargements, terminal brackets having means for mechanical and electrical connection with said electrodes and having slots to receive the section-feet to position the sections in parallel, spaced relation, clamping blocks connected with said brackets between and engaging the section feet, and primary coils disposed in the spaces between said secondary sections.

24. In a machine of the character described, the combination of roller electrodes, a transformer, secondary-terminal brackets having, near their outer surfaces, ball-bearings, and carrying, near their inner surfaces, tangentially converging contact brushes, said electrodes having hub portions engaging said bearings and boss-portions receiving the contact brushes.

GUSTAVE V. JOHNSTON.